Jan. 13, 1925. 1,523,123

J. JACOBY

RECORDER FOR AUTOMOBILES

Filed April 16, 1923

Inventor
Joseph Jacoby

Patented Jan. 13, 1925.

1,523,123

UNITED STATES PATENT OFFICE.

JOSEPH JACOBY, OF BELGIUM, WISCONSIN.

RECORDER FOR AUTOMOBILES.

Application filed April 16, 1923. Serial No. 632,438.

*To all whom it may concern:*

Be it known that I, JOSEPH JACOBY, a citizen of the United States, and resident of Belgium, in the county of Ozaukee and State of Wisconsin, have invented certain new and useful Improvements in Recorders for Automobiles; and I do hereby declare that the following is a full, clear, and exact description thereof.

My invention has for its primary object to provide a clock mechanism attachable to a movable element of a motor driven vehicle, the construction and arrangement being such that the clock is stopped when the vehicle comes to rest and is automatically started when the vehicle is put in motion. Thus the time intervening between stopping and starting the vehicle can be accurately determined by inspection of the clock mechanism. The clock attachment is particularly designed to be associated with a cyclometer or speedometer and is placed in convenient position on the instrument board of the vehicle.

The specific object of my invention is to provide the escapement wheel of the clock in such position with relation to a speedometer indicating wheel that the said wheel will control the escapement wheel of the clock.

With the above and other objects in view, the invention consists in certain peculiarities of construction and combination of parts, as will be hereinafter set forth with reference to the accompanying drawings and subsequently claimed.

In the drawings:—

Figure 1:
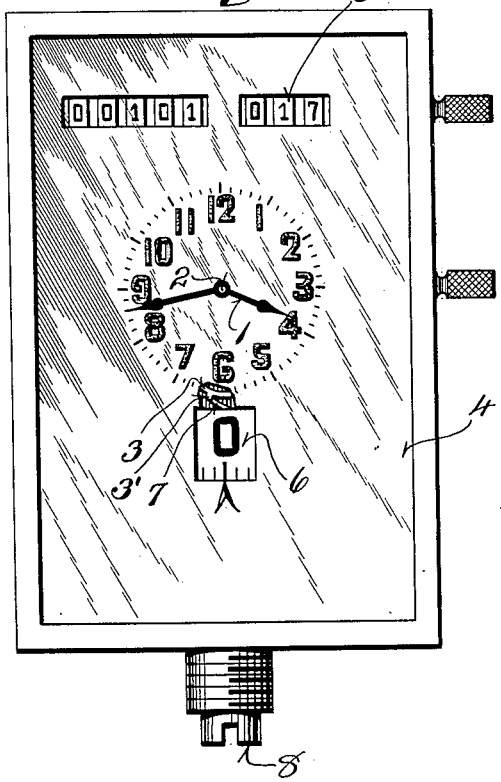
Figure 1 represents a face view of a box having mounted therein a clock attachment embodying the features of my invention.

Referring by characters to the drawings, 1 represents the hands of an ordinary watch or clock which is mounted upon the usual shaft elements 2, and 3 indicates the standard escapement wheel of the clock mechanism. The clock mechanism is encased within a suitable box 4 having openings at its top to display standard cyclometer wheels 5, and an opening at its bottom below the clock face to display the indicating features of a speedometer wheel 6.

The speedometer wheel has extending therefrom a locking lug 7 which locking lug is in a path of travel to engage the teeth 3' of the escapement wheel 3. The speedometer wheel is suitably connected to a movable part of a motor-driven vehicle by a shaft coupling element 8 which constitutes the connection to the speedometer wheel 6.

All of these parts are of standard construction and form no part of my invention.

Figure 2:
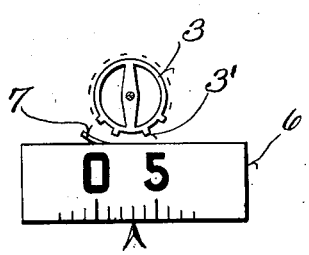
Figure 2 is a detail view of the clock escapement wheel associated with a speedometer indicating wheel having a locking lug for engagement with the escapement wheel.
Figure 3:
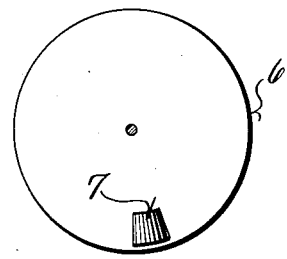
Figure 3 is a plan view of the speedometer indicating wheel.

When the speedometer wheel is active, as shown in Figure 2 of the drawings, the locking lug 7 is clear of the escapement wheel teeth 3', due to the fact that the speedometer wheel revolves from right to left. Hence, the escapement wheel of the clock mechanism being free, the clock will function in the ordinary manner.

Should the vehicle come to rest, the zero point of the speedometer wheel will drop back to a position in vertical alinement with the escapement wheel and thus lock the clock against movement until such time as the vehicle is started, under which conditions the speedometer wheel will immediately move from right to left depending upon the speed of the vehicle, and will release the escapement wheel for its ordinary functioning.

From the foregoing it will be seen that a simple and convenient means is provided for stopping the time piece co-incident to the vehicle coming to rest, due to the relation between the escapement wheel of the time piece and the speedometer wheel 6. Hence, the driver of the vehicle is able to determine by comparison with standard time the interval between starting and stopping his vehicle, which, under certain conditions, is a very convenient accessory to an automobile.

While I have shown and described one simple mechanism for the desired results, it is understood that I may vary the structural features of the mechanism within the scope of the claim.

I claim:—

An indicating device comprising a casing, clock mechanism mounted therein and having an escapement wheel, a speedometer mounted within said casing, and having a legend bearing movable member, and a lug carried directly by said movable member and rigidly attached thereto and adapted to positively engage said escapement wheel when said movable member is at its zero position, said lug having motion of translation and adapted to be bodily carried away from said escapement wheel when the said movable member of the speedometer is moved from zero position.

In testimony that I claim the foregoing I have hereunto set my hand at Milwaukee, in the county of Milwaukee and State of Wisconsin.

JOSEPH JACOBY